United States Patent [19]
Wilson

[11] Patent Number: 5,382,032
[45] Date of Patent: Jan. 17, 1995

[54] STEPLADDER DOLLY

[76] Inventor: James R. Wilson, P.O. Box 263, Looper, Tex. 75432

[21] Appl. No.: 74,474

[22] Filed: Jun. 11, 1993

[51] Int. Cl.⁶ .............................................. B62B 1/12
[52] U.S. Cl. .................................... 280/30; 280/652; 280/47.131; 280/47.27
[58] Field of Search ............... 280/30, 651, 652, 659, 280/641, 47.131, 47.17, 47.24, 47.27, 63; 182/20, 21, 28, 127

[56] References Cited

U.S. PATENT DOCUMENTS

| | | | |
|---|---|---|---|
| 2,919,138 | 12/1959 | Brower et al. | 280/35 |
| 3,954,155 | 5/1976 | Guidara | 182/20 |
| 4,049,283 | 9/1977 | Brookes et al. | 280/47.131 |
| 4,106,590 | 8/1978 | Tarran | 182/20 |
| 4,169,164 | 12/1992 | Bradford | 280/35 |
| 4,253,546 | 3/1981 | Uchida | 280/30 |
| 4,258,826 | 3/1981 | Murray | 280/30 |
| 4,934,485 | 6/1990 | Purkapile | 280/30 |
| 5,026,078 | 6/1991 | Pinckney | 280/5.2 |

*Primary Examiner*—Richard M. Camby
*Attorney, Agent, or Firm*—Richard C. Litman

[57] ABSTRACT

A wheeled stepladder dolly is disclosed wherein the dolly is engageable with both a step of the ladder and the existing cross braces on the support portion of a conventional stepladder to temporarily hold the stepladder in a fixed relationship with the dolly, thus providing a stepladder dolly assembly to be used for transporting heavy boxes of tools or the like. The engagement means are adjustable and configured to be adaptable for a number of brands and varieties of commercially available stepladders.

20 Claims, 4 Drawing Sheets

5,382,032

STEPLADDER DOLLY

BACKGROUND OF THE INVENTION

1. Field of the Invention

The present invention relates to non-motorized wheeled transport. More specifically, it relates to a portable dolly made up of a conventional, folding stepladder and a wheeled carriage. Additionally, the invention includes a dolly carriage that receives and holds the stepladder in place and then allows the ladder to be used as a platform for boxes, tools, and the like, during movement of the stepladder dolly.

2. Description of the Prior Art

Contractors or "do-it-your-selfers" working on homes oftentimes require not only a stepladder or extension ladder to facilitate their tasks, but almost certainly will require tools, power cables, boxes of materials, and the like during the course of the project. When a ladder along with tools or materials are needed on the same job site or in the same area of a job site, two or more trips are required to bring the various items to the location they are needed. A number of dolly-like devices and dollies directed towards use with ladders have been devised.

In U.S. Pat. No. 2,919,138 issued to Bailey Brower on Dec. 29, 1959 there is disclosed a dolly attachment for suitcases or the like. The device consists of two mirror-image brackets connected to stub axles and wheels. The brackets are connected by a coiled spring that, in its relaxed position, holds them in a spaced apart relationship that is less then the width of a standard suitcase.

Another patent of interest is U.S. Pat. No. 3,954,155 issued on May 4, 1976 to Orlando Guidara. This discloses a stepladder dolly with rotatably mounted dolly wheels connected by an axle, and also having secondary roller means in the form of a pair of caster wheels.

Next is U.S. Pat. No. 4,049,283 issued on Sep. 20, 1977 to Malcolm J. Brookes et al. The ladder caddy disclosed here has a two wheel carriage formed by a pair of vertical legs joined at the top by bridge members with rotatably mounted wheels on the lower ends. Cross braces are provided on the device for strength.

U.S. Pat. No. 4,106,590 issued on Aug. 15, 1978 to Phil Keith Tartan discloses a combined hand truck and ladder. The device has a frame with a pair of elongated side rails interconnected by cross braces. The lower portion has a load supporting foot connected to the ends of the side rails and there are axles carrying a pair of wheels.

Next is U.S. Pat. No. 5,026,078 issued on Jun. 25, 1991 to Kenneth P. Pinckney. This discloses a harp caddy wherein there is shown a platform, clamping means to engage the feet of the harp, and wheels.

Lastly, U.S. Pat. No. 5,169,164 issued on Dec. 8, 1992 to Michael A. Bradford discloses a cooler tote that includes support means, straps, and a means to connect each to the other. The support means includes wheels and an axle to permit the cooler to be moved over rough terrain without disturbing the contents therein.

None of the above inventions and patents, taken either singly or in combination, is seen to describe the instant invention as claimed.

SUMMARY OF THE INVENTION

Accordingly, it is a principal object of the invention to provide a wheeled stepladder dolly where the dolly is engageable with both a step and the cross braces on the support portion of a conventional stepladder to temporarily hold the stepladder in a fixed relationship with the dolly, thus allowing the stepladder to be used for transporting tools or the like. The engagement means are adjustable and configured to be adaptable for a number of brands and varieties of commercially available stepladders.

It is another object of the invention to provide a dolly that is easily portable.

It is a further object of the invention to provide a dolly for stepladders that can be folded to a smaller compass for easy storage.

Still another object of the invention is to provide a dolly for stepladders wherein the engagement means for receiving the ladder can be adjusted for different configurations of ladder steps and support braces.

Yet a further object of the invention is to provide a wheeled stepladder dolly made up of an otherwise conventional stepladder and a dolly carriage.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The discussion of the present invention is best broken up into two parts. The first is a physical description of the device that refers in the main to FIGS. 2 and 3. The second is a description of the engagement and interaction of the device and a conventional stepladder.

Figure 2:
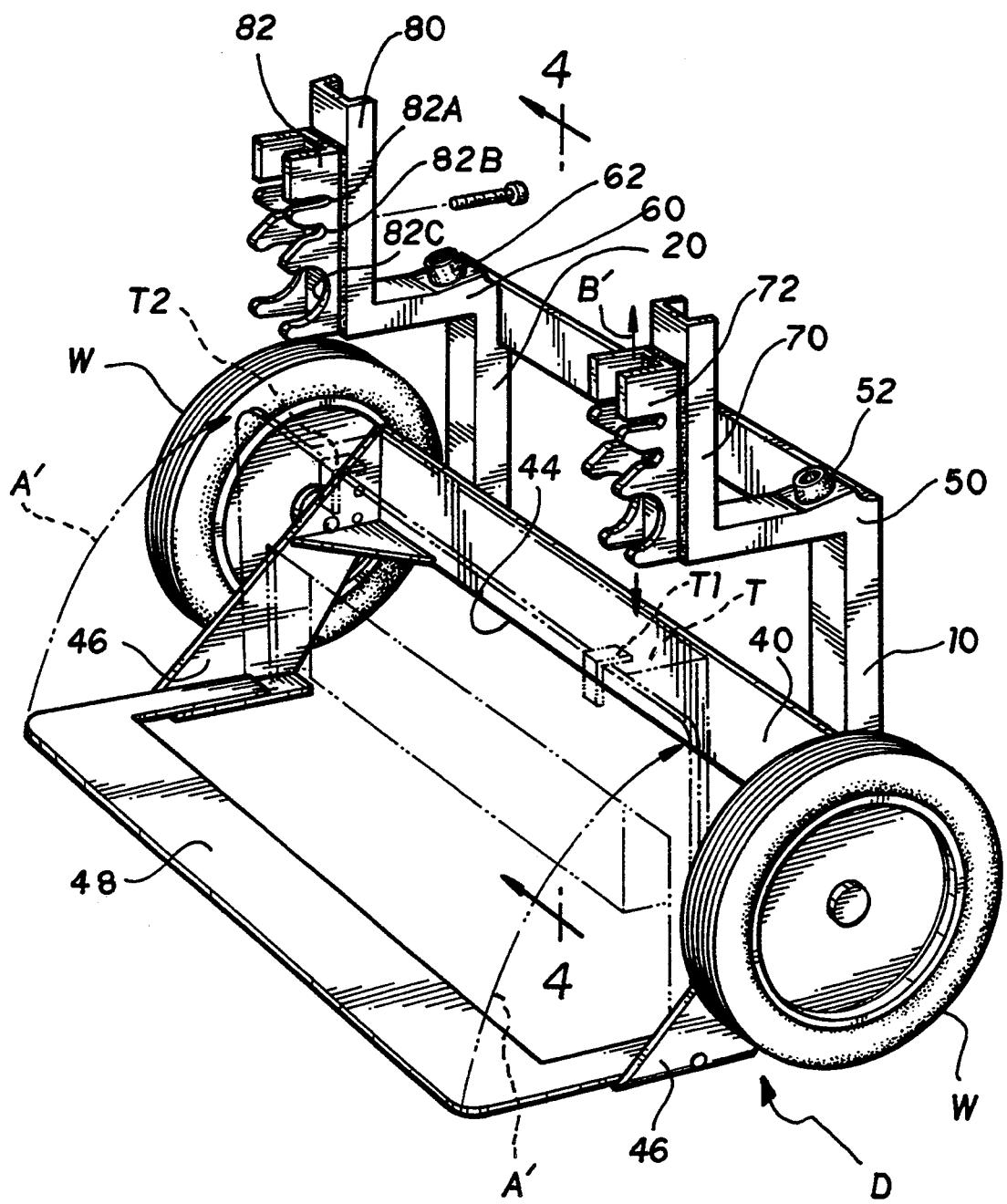
FIG. 2 is a perspective view of the ladder dolly showing the pivotable front lip and the ladder engaging members.
Figure 3:
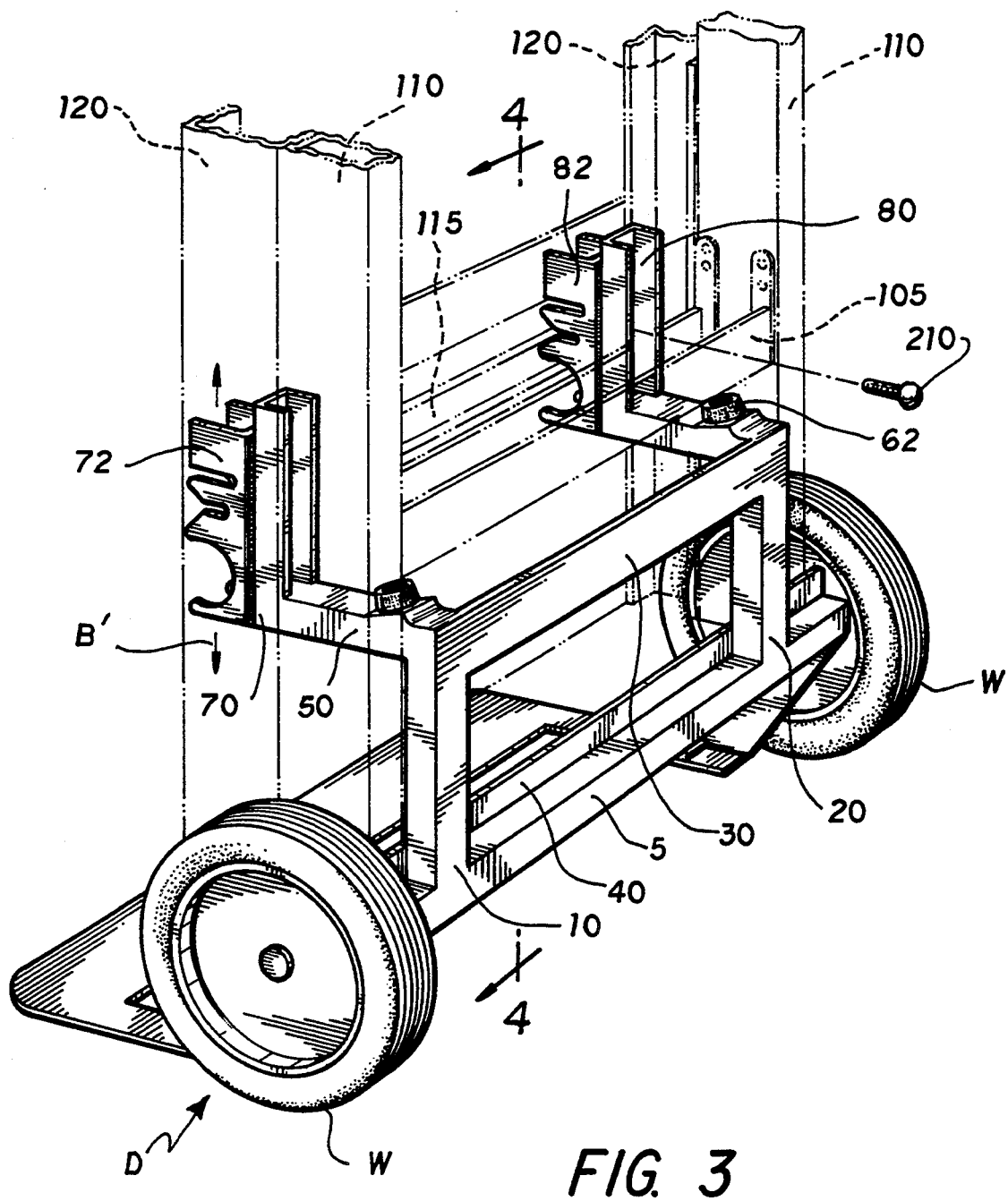
FIG. 3 is another perspective view showing the optional clip-on tool box and the adjustable ladder engagement means.

Referring now to FIGS. 2 and 3. The stepladder dolly D has one lower main frame support 5 and two vertical frame supports 10, 20. Spanning the two supports 10, 20 is a crossbrace and handle 30. Attached to the lower main frame support and extending completely along its length is a ladder support member 40. As best seen in FIG. 2, the ladder support member 40 has a pair of ladder stop means 42 integral with it and proximate the bottom edge 44 thereof. Also integral to both the support member 40 and each of the stop means 42 are a pair of side member extensions 46 that extend downward and away from the support member 40. The interaction of the ladder support member 40, the stop means 42, the vertical frame supports 10, 20, and the side member extensions 46 form a stepladder leg stop means, as will be discussed further below. It should be noted that, though in FIG. 2 only one of the ladder stop means 42 can be seen, the other is configured identically. There is a pivotable load stop 48 that spans the two side member extensions 46. The pivotable load stop 48 rotates on a pair of load stop pins 48' that both extend through the side member extensions 46. An example of this rotation is shown by the arrows A' in FIG. 2. Also shown in FIG. 2 is an optional tool box T, shown in broken lines frictionally attached by a pair of clips T1, T2 to the pivotable load stop 48.

Extending from the junctures of the crossbrace and handle 30 and the two supports 10, 20, are a pair of ladder step engagement means 50, 60. These extend forward parallel to one another and each further includes an angled section that has thereon a cushioned rest, 52, 62. At the end of each of the step stop means 50, 60 are engagement support members 70, 80. These members 70, 80 each extend vertically at a 90° angle to each of the stop means 50, 60. Thus each of the engagement support members 70, 80 lie in a plane substantially parallel to the main body supports 10, 20. Located on each of the engagement support members 70, 80 are ladder crossbrace engagement means 72, 82. Both the pairs of engagement support members 70, 80, and the crossbrace engagement means 72, 82 along with the adjustment means linking them will be discussed further below. Rotatably attached to both of the side member extensions 46 are two wheels W. The wheels W could be thus rotatably engaged with the side members 46 by a number of means that would be obvious to any one of normal skill in the art, and these means will not be discussed further in this specification. The wheels should be of sufficient size, however, to allow the ladder, the dolly, and the lead carried thereon to be moved easily up and down stairs and the like.

Figure 1:
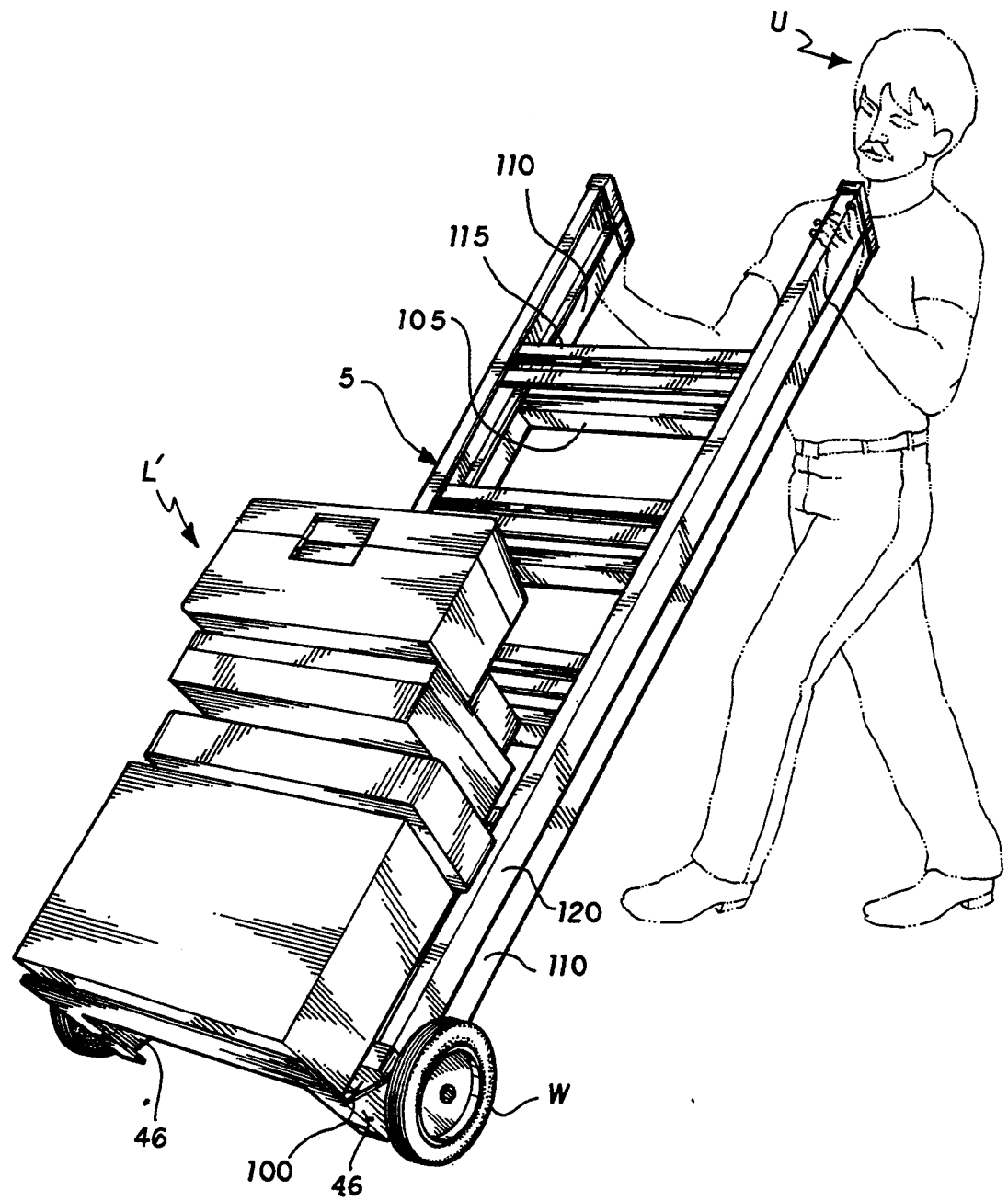
FIG. 1 is environmental perspective view of the ladder dolly in use.
Figure 4:
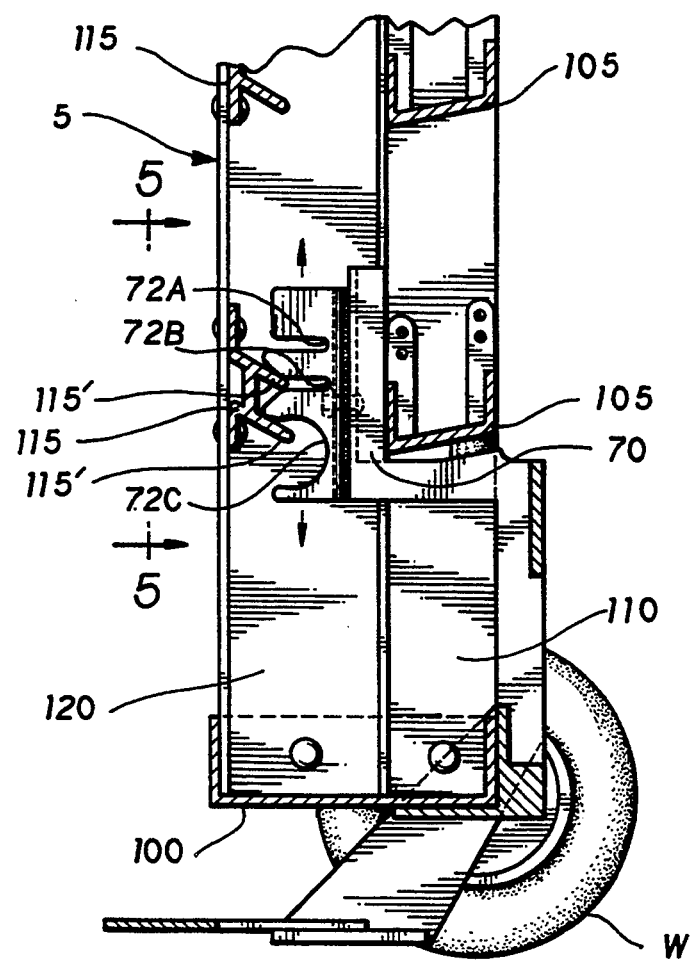
FIG. 4 is an partial side view taken along line 4—4 in FIGS. 2 and 3 showing the adjustable ladder engagement means and a close up view of the same engaging a stepladder.
Figure 5:
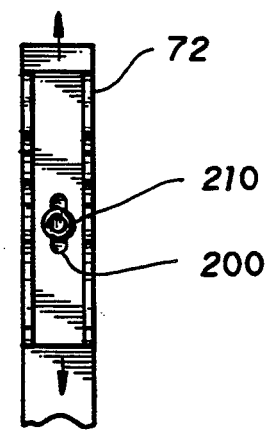
FIG. 5 is a partial view taken along the line 5—5 in FIG. 3 showing the adjustable connection means that allow the crossbrace engagement member to be moved in the direction of the arrow B'.

Turning now to FIGS. 4 and 5, the discussion turns to the way that the present invention cooperates with a conventional stepladder S. For the purposes of this discussion, a conventional stepladder will be defined as the well known household utility that has two main sections that pivot relative to one another about one pivot point (not shown). This point is proximate one end designated 100 in the accompanying illustrations, specifically FIGS. 1 and 4. The two main sections of the conventional stepladder S consist of the steps 105 and step frame supports 110 and the cross braces 115 and cross brace supports 120. The present invention is used by inverting the dolly D and placing it on a conventional stepladder S that is in an unfolded or standard usage configuration, i.e. one in which the two main sections discussed above are forming the largest angle possible at the pivot point (not shown). The device is placed so that a step 105, which in the preferred embodiment discussed herein is the step nearest the end 100, is in solid contact with the cushioned rests 52, 62, as seen in FIG. 3 and 4. Thus, as also can be seen in FIG. 3, each of the step supports 110 pass externally of either the vertical frame support 10 or the frame support 20 and the stepladder end 100 is supported on both the ladder stop means 42. At this point the stepladder S is folded into the closed position where the two main sections are generally parallel to one another. As seen in FIG. 4, each of the crossbrace engagement means 72, 82 have, when viewed from the side, three crossbrace engaging slots 72A, 72B, 72C and 82A, 82B, and 82C (see FIG. 2). The crossbrace engaging slots are arranged and configured such that they engage the protruding portions 115' of the cross braces 115, as clearly seen in FIG. 4. At this point, the stepladder S is held securely in relation to the dolly D. Laterally, it is engaged by the side members 46, the stop means 42, the ladder support member 40, and the vertical frame supports 10, 20. These elements form a ladder leg engagement means as mentioned above. Anterior or posterior movement (towards or away from the user U as seen in FIG. 1) is prevented by virtue of the crossbrace engaging members 72, 82 and the ladder step engagement means 50, 60. Any up or down movement that would tend to disturb the load L' (shown in FIG. 1) is halted by the presence of the engagement support means 70, 80 between the two main sections of the stepladder S.

Turning to FIG. 5, it is seen that the crossbrace engagement means 72, 82 are adjustably attached to the engagement means supporting members 70, 80 by means of a slot 200 in the crossbrace engagement means 72, 82 and a bolt 210 that has an engaging nut (not shown). As above, though only crossbrace engagement means 72 is shown in FIG. 5, it should be understood that the arrangement for engagement means 82 is similar. Thus, the engagement means 72, 82 can be moved in the directions of the arrow B' and fixed in place at a predetermined location. With his arrangement, the dolly D can be adapted for various brands of stepladders S wherein the spacing of the steps and crossbracings vary. Likewise, the various shapes of the crossbrace engaging slots 72A, 72B, 72C, 82A, 82B, 82C in combination with the above-described adjustment means allows for even more varieties of crossbracings to be accommodated by the dolly D.

It is to be understood that the present invention is not limited to the sole embodiment described above, but encompasses any and all embodiments within the scope of the following claims.

I claim:

1. A dolly for use with a conventional stepladder having a step portion including a pair of legs and a plurality of steps and a support portion including a pair of legs and a plurality of crossbraces, and with both stepladder portions being respectively pivotable in relation to one another to allow for an open and closed configuration, said dolly comprising:

a support frame, said support frame including a leg engaging means arranged and configured to receive the legs of a stepladder, and a crossbrace engagement support means that further includes a step engaging means;

a crossbrace engagement means proximate said crossbrace engagement support means, said crossbrace engagement means arranged and configured to receive at least one of the plurality of crossbraces on the support portion of the stepladder;

a load stop connected to and protruding from said leg engagement means; and at least two wheels pivotably connected to said leg engagement means; whereby when the stepladder is in an open configuration, said dolly can be placed such that said step engagement means is in contact with a step of the stepladder and said leg engagement means further places the legs and thus the stepladder in a partially fixed relationship with said dolly, and whereby then placing the stepladder into a closed configuration brings the crossbrace engagement means into contact with the crossbraces on the support portion thus further bringing the stepladder into a fixed relationship relative to said dolly such that said dolly and the stepladder can be moved together on said wheels and the support portion and step portion of the stepladder will support and thus transport a load, said load being held maintained in position by said load stop.

2. The dolly for use with a conventional stepladder according to claim 1, wherein:
said leg engaging means further includes a pair of flanges spaced to receive the legs of the stepladder.

3. The dolly for use with a conventional stepladder according to claim 1, wherein:
said support means further includes two generally parallel support members spanned by at least one cross member, said cross member thus forming a handle for transport when said dolly is not in use.

4. The dolly for use with a conventional stepladder according to claim 3, wherein:
said crossbrace engagement support means comprises two members proximate the juncture of said two support members and one of said cross members and where said step engaging means comprises a pair of bevels integral with each of said crossbrace engagement support means.

5. The dolly for use with a conventional stepladder according to claim 4, wherein:
said bevels further include a cushioning means to prevent damage to the stepladder.

6. The dolly for use with a conventional stepladder according to claim 4, wherein:
said crossbrace engagement means further includes means to adjustably engage said crossbrace support means.

7. The dolly for use with a conventional stepladder according to claim 6, wherein:
said adjustment means comprises a slot in said engagement support means, an aperture in said engagement means, and a threaded fastening means engageable with both.

8. The dolly for use with a conventional stepladder according to claim 7, wherein:
said crossbrace engagement means includes a plurality of engaging slots to accommodate various cross braces.

9. The dolly for use with a conventional stepladder according to claim 8, wherein:
at least one of said engaging slots is generally arcuate.

10. The dolly for use with a conventional stepladder according to claim 1, wherein:
said crossbrace engagement means further includes means to adjustably engage said crossbrace support means.

11. The dolly for use with a conventional stepladder according to claim 10, wherein:
said adjustment means comprises a slot in said engagement support means, an aperture in said engagement means, and a threaded fastening means engageable with both.

12. The dolly for use with a conventional stepladder according to claim 11, wherein:
said crossbrace engagement means includes a plurality of engaging slots to accommodate various cross braces.

13. The dolly for use with a conventional stepladder according to claim 12, wherein:
at least one of said engaging slots is generally arcuate.

14. The dolly for use with a conventional stepladder according to claim 1, wherein:
said crossbrace engagement means includes a plurality of engaging slots to accommodate various cross braces.

15. The dolly for use with a conventional stepladder according to claim 14, wherein:
at least one of said engaging slots is generally arcuate.

16. The dolly for use with a conventional stepladder according to claim 1, wherein:
said load stop comprises a generally planar surface extending at a right angle in relation to the plane common to said two generally parallel support members.

17. The dolly for use with a conventional stepladder according to claim 1, wherein:
said load stop is pivotably attached to said leg engagement means.

18. A stepladder dolly comprising, in combination, a conventional stepladder having a step portion including a pair of legs and a plurality of steps and a support portion including a pair of legs and a plurality of crossbraces, and with both stepladder portions being respectively pivotable in relation to one another to allow for an open and closed configuration, said dolly comprising:
a support frame, said support frame including a leg engaging means arranged and configured to receive the legs of a stepladder, and a crossbrace engagement support means that further includes a step engaging means;
a crossbrace engagement means proximate said crossbrace engagement support means, said crossbrace engagement means arranged and configured to receive at least one of the plurality of crossbraces on the support portion of the stepladder;
a load stop connected to and protruding from said leg engagement means; and
at least two wheels pivotably connected to said leg engagement means; whereby
when the stepladder is in an open configuration, said dolly can be placed such that said step engagement means is in contact with a step of the stepladder and said leg engagement means further places the legs and thus the stepladder in a partially fixed relationship with said dolly, and whereby then placing the stepladder into a closed configuration brings the crossbrace engagement means into contact with the crossbraces on the support portion thus further bringing the stepladder into a fixed relationship relative to said dolly such that said dolly and the stepladder can be moved together on said wheels and the support portion and step portion of the stepladder will support and thus transport a load, said load being held maintained in position by said load stop.

19. The dolly and stepladder combination according to claim 18, wherein:
said crossbrace engagement means further includes means to adjustably engage said crossbrace support means.

20. The dolly and stepladder combination according to claim 19, wherein:
said adjustment means comprises a slot in said engagement support means, an aperture in said engagement means, and a threaded fastening means engageable with both.

* * * * *